United States Patent
Zane et al.

[11] 3,903,579
[45] Sept. 9, 1975

[54] ARTICLE WITH MOVABLE APPENDAGES

[76] Inventors: Ronald S. O. Zane, 2572 Hammer Ave., Norco, Calif. 91760; Lester W. Mendell, Jr., 1432 Mariposa, Corona, Calif. 91720

[22] Filed: Aug. 17, 1972

[21] Appl. No.: 281,504

Related U.S. Application Data

[62] Division of Ser. No. 888,796, Dec. 29, 1969, Pat. No. 3,697,362.

[52] U.S. Cl. .................................................. 29/183
[51] Int. Cl.² ............................................ B22F 5/00
[58] Field of Search .......... 161/30, 31; 29/183, 190, 29/180 A, 180 NM, 180, 193, 193.5; 24/259; 40/20 R; 47/55

[56]  References Cited
UNITED STATES PATENTS 2,595,577  5/1952  Harris .................................. 161/31

*Primary Examiner*—L. Dewayne Rutledge
*Assistant Examiner*—O. F. Crutchfield
*Attorney, Agent, or Firm*—John H. Crowe

[57] ABSTRACT

An artificial flower having a plastic center, or pistil, and plastic pedals spaced outwardly from, and arranged evenly around, the periphery of the pistil. The petals are connected to the pistil by means of flexible "stems" of dead-soft character. These stems are of U-shaped configuration and comprise the outer portions of the legs of a spider-like member, the central part of which is embedded in the flower pistil. Each of the legs extends laterally from a common center a fixed distance, then is bent to extend perpendicularly through the bottom of the pistil and formed into the shape of a U, the outer terminus of which is embedded in the inner end of one of the flower petals. As a result, each of the flower petals has a U-shaped stem which permits it to be tilted through a relatively wide arc.

The flower is molded from a suitable polyester resin in a mold having a central well for the pistil and surrounding depressions for the petals. The petal depressions are separated from the central well, so there is no channel for resin flow therebetween. The legs of the spider-like member are shaped to permit the central portion of the member to fit into the central well in the mold, with each leg extending radially from a central hub, then curving upwardly over the rim of the well, and downwardly into one of the petal depressions.

3 Claims, 7 Drawing Figures

ARTICLE WITH MOVABLE APPENDAGES

This is a divison of application Ser. No. 888,796, filed Dec. 29, 1969 now U.S. Pat. No. 3,697,362.

BACKGROUND OF THE INVENTION

This invention relates generally to artificial flowers, and objects of a similar character, and more particularly to plastic flowers having tiltably adjustable petals for an added dimension of decorative utility.

Plastic flowers of a variety of shapes, sizes and degress of authentic similarity to real flowers have been commercially available for some time. To our knowledge, however, no such flowers with tiltably adjustable petals have yet been proposed. A flower of this type with petals individually adjustable to various positions of tilt around a central pistil would, we believe, have much greater appeal to the imaginative than the ordinary plastic flower with its waxen rigidity.

Perhaps the principal reason for the lack of availability of an artificial flower with adjustable petals has resided in the difficulty of molding a plastic product of this type. The conventional mold for a plastic flower has communicating flow-paths between the depressions defining the various parts of the flower, so that the molded product has all of its parts rigidly formed into an integrated whole. Such a mold is obviously incompatible with the concept of an artificial plastic flower with tiltably adjustable petals.

SUMMARY OF THE INVENTION

The present invention involves the use of a unique mold and "petal stem" member with branching legs in such a way as to permit the relatively easy and inexpensive molding of flowers with tiltably adjustable petals. Our flower mold is, in its preferred form, similar to a conventional mold, but characterized by the presence of separate (noncommunicating) depressions in which the flower pistil and its several petals are individually formed. The legs of the "petal stem" member have U-shaped outer segments, and our key to success in molding a flower with tiltably adjustable petals resides in the incorporation of this member into the flower structure to permit its U-shaped leg segments to serve as stems for the flower petals. This petal stem member, or cog, as it will hereinafter be called, is preferably formed from thin sheet metal, and has legs of sufficiently dead-soft character to permit their easy bending into various shapes without opposing "spring-back" tendencies, and strong enough to support the flower petals throughout their ranges of tilt.

The above description of the cog is in relation to its normal configuration for flower molding purposes, this being such that the U-shaped segments of the legs of the use-oriented cog extend up out of the flower pistil depression, and then curve outwardly and respectively downwardly into the surrounding petal depressions, of the flower mold, to provide the above-indicated U-shaped stems for the petals of the finished flower.

It will be evident from the foregoing, and subsequent teachings herein, that the U-shaped segments of the legs of the aforesaid cog make resin flow communication between the pistil and petal depressions in the flower mold unnecessary, since the curved shape of these segments permits them to "jump" spaces between these depressions and form curved stems between the flower pistil and petals. It will also be apparent that the stems, as a result of their curving shape and above-indicated properties of dead-softness and strength, have great flexibility and can be bent through a wide range of positions. It is within the scope of our invention to employ more than one cog conjunctively with a mold having a sufficient plurality of petal depressions to yield a flower with a number of petals in excess of the number of legs of a single cog.

A particular advantage of our flower molding procedure resides in the ability to thereby mold a flower with differently colored pistil and petals. This is made possible by the separation of the pistil and petal depressions in our mold and consequent lack of fluid flow communication therebetween. Thus, a resin mix of one color can be placed in the pistil depression, and a mix of another color in the petal depressions, without fear of color contamination in the molded parts of the flower as a result of resin intermixing during the flower molding, or casting, process. This kind of color control is, for reasons made clear above, impossible in presently employed flower molding procedures.

It is thus a principal object of this invention to provide an article flower having adjustable petals movable through a wide range of tilt positions about a central pistil.

It is another object of the invention to provide a unique mold and petal stem cog combination uniquely cooperative to permit plastic flowers with such adjustable petals to be quickly, easily and inexpensively produced.

Still another object of the invention is to provide a simple, easy and inexpensive technique for the preparation of molded plastic flowers with separately colored pistil and petals without risk of color contamination of either during the flower molding operation.

Other objects, features and advantages of the invention will become apparent in the light of subsequent disclosures herein.

DESCRIPTION OF THE PREFERRED EMBODIMENTS

Figure 1:
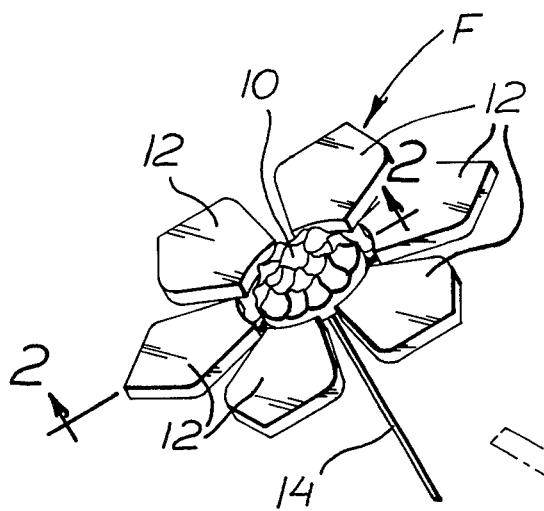
FIG. 1 is an isometric view of a preferred form of molded plastic flower in accordance with this invention.

Considering now the drawings in greater detail, and focusing first on FIGS. 1–4, there is shown generally at F an illustrative embodiment of a plastic (preferably polyester plastic) flower in accordance with this invention. Flower F has a molded central part 10 simulating a pistil, referred to hereinafter as pistil 10, and six separate members 12 of generally flat configuration, molded in the general form of flower petals and referred to hereinafter as petals 12. Additionally, flower F has a wire stem 14, one end of which passes into pistil 10 from the underside to embedment therein. Wire stem 14 is a length of enamel-coated, low-carbon steel florist's wire of a type known to those skilled in the art. Such wire is commercially available in differing gauge sizes, of which guage sizes 16, 18 and 20 are preferred for our purpose. As will be seen, flower F is a graphical illustration of an actual flower made in accordance with present teachings. In this flower, which served as a model for flower F, the stem corresponding to stem 14 of the latter was made of 16-gauge florist's wire.

Figure 3:
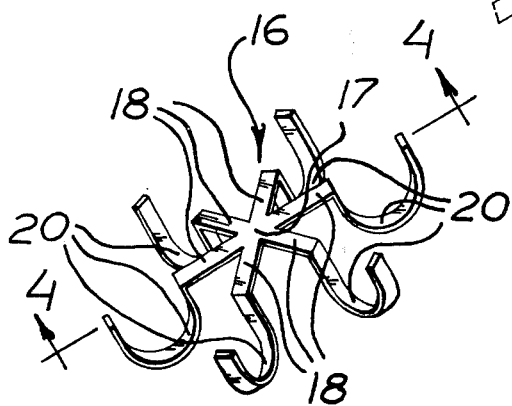
FIG. 3 is a still further enlarged, isometric view of a six-legged cog such as employed to provide petal stems for the FIG. 1 flower.

Petals 12 are separately connected to pistil 10 of flower F by the legs of a cog 16 such as shown in FIG. 3. Cog 16 is a spider-like member with six legs 18 radiating outwardly from a central hub 17. The cog is formed from thin, relatively soft sheet metals, preferably, but not necessarily, nickel-plated, low-carbon steel, of about 15-mil thickness. Because of the relative softness and thinness of the sheet metal stock from which they are formed, the legs of the cog are readily flexible. It would be within the scope of our invention to substitute for cog 16 an alternative form of cog differing from the former in noncritical details (as, for example, a cog constructed of dead-soft aluminum rod or equivalent material), but suitably characterized for our purpose as taught herein.

Figure 2:
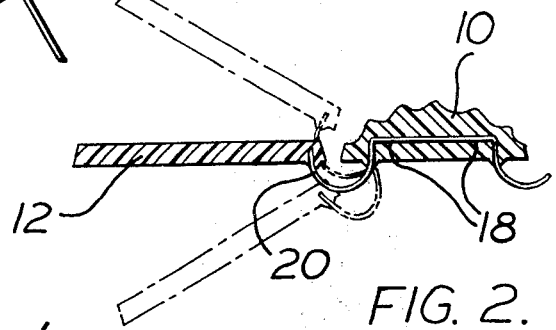
FIG. 2 is an enlarged, fragmentary view, taken mostly in section along line 2—2 of FIG. 1, of the flower, showing, in phantom lines, alternative tilt positions of one of the flower petals.
Figure 4:
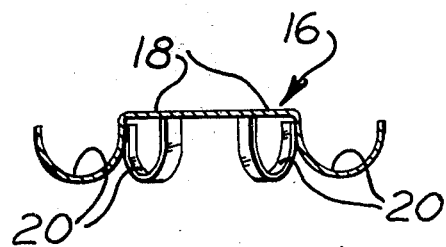
FIG. 4 is a cross-sectional view of the cog, taken along line 4—4 of FIG. 3.

The six legs of cog 16 extend coplanarly outwardly an equal distance from hub 17, then bend sharply through respective 90° turns, after which they are curved into U-shaped segments 20, all as illustrated in FIGS. 2, 3 and 4.

As FIG. 2 makes clear, the hub and coplanar portions of the legs of cog 16 are embedded in pistil 10, in a plane generally parallel to the bottom surface of the pistil, and the radially inwardly disposed arms of the U-shaped segments of the legs extend downwardly through this bottom surface. The radially outwardly disposed arms of these U-shaped segments extend upwardly into the inner ends of petals 12 of flower F to relatively deep embedment in the petals, again as FIG. 2 makes clear.

As a result of the above-described relationship of parts, each of the flower petals 12 is connected to pistil 10 through a U-shaped stem, constituting the U-shaped segment 20 of a separate one of the cog legs 18. This U-shaped stem is, for reasons hinted at above, flexible and of dead-soft character. Because of this, and the inherent strength and U-shaped configuration of the stem, the petal held by the latter is easily tiltable through a sweeping range of arcuate movement and incrementally adjustable to any position within this range, two such positions being illustrated in phantom lines in FIG. 2. Petals 12 are relatively light in weight so that the legs of cog 16 need not be very thick to assure adequate support for the petals in their various positions of tilt.

As previously indicated, flower F is patterned after an actual flower made by us in accordance with present teachings. This latter flower was of five-inch diameter petal spread, and its cog was formed from nickel-plated, low-carbon steel sheet stock of 15-mil thickness. Such sheet stock will be familiar to those skilled in the art, and is readily available through the normal commercial channels handling such materials. The pistil and petals of flower F can be formed from any polyester casting resin of conventional type, of which there are many. Such casting resins are generally designated by generic name and catalog number, as exemplified by casting resin 50114 (manufactured by Pittsburgh Plate and Glass Industries), polyester resin 32–036 (Reichhold Chemicals, Inc.), and water-extended polyester resin 32–177 (Reichhold).

The pistil and petal portions of our artificial flower can, if desired, be made of other than polyester resin. These parts can, for example, be formed from any material equivalent to polyester resin in molding properties, typical of which are epoxy casting mixtures (for example, epoxy 37–130 and catalyst 37–602, manufactured by Reichhold Chemicals, Inc.), plaster of Paris; etc. Suitable dyes, coloring pigment, or the like, can be incorporated in the flower pistil and petal castings to achieve desired color effects, within the scope of our invention. As those to whom these teachings are directed will appreciate, the present state of casting and molding technology, and availability of the necessary starting materials for casting operations, are such as to permit the easy practice of our invention without detailed treatment of the involved steps and ingredients herein.

Figure 5:
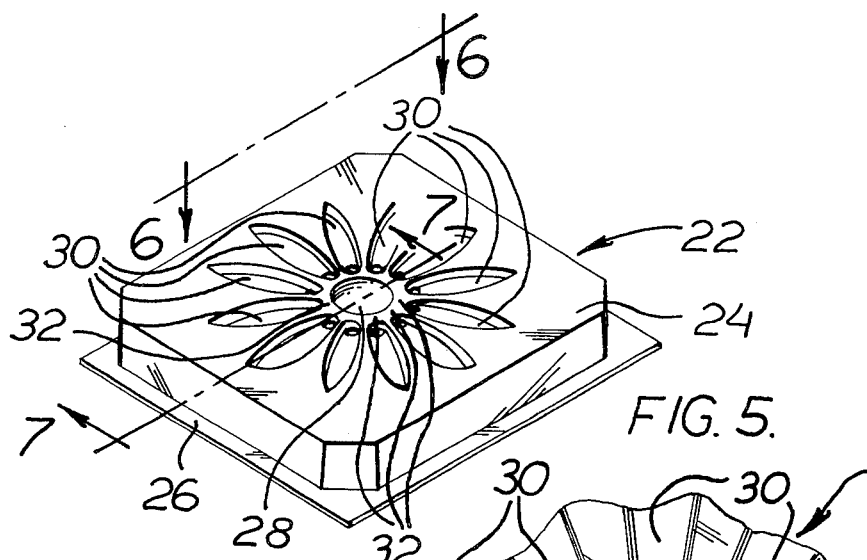
FIG. 5 is an isometric view of a mold suitable for use in the preparation of a plastic flower in accordance with this invention of different petal design that that of FIG. 1.
Figure 6:
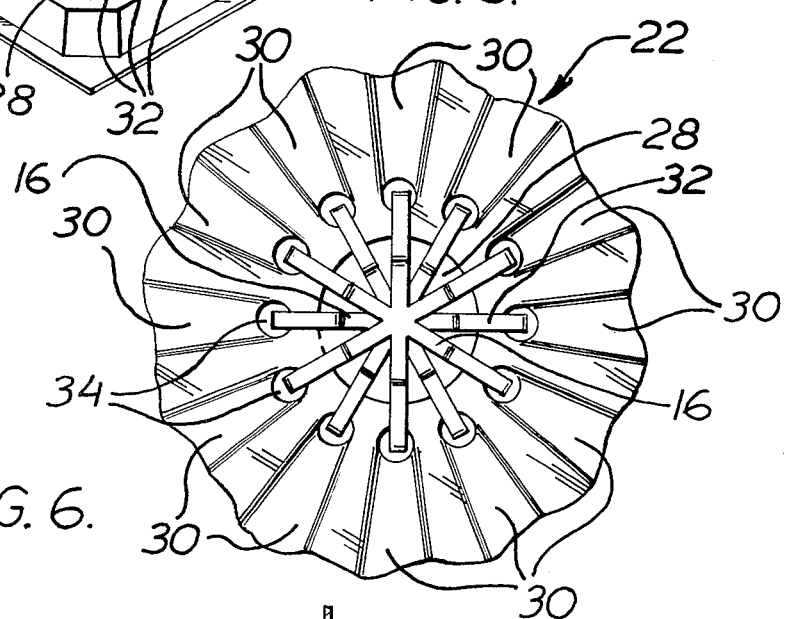
FIG. 6 is an enlarged, fragmentary top view of the FIG. 5 mold and a pair of cogs like that of FIG. 3 positioned for incorporation in a plastic flower to be cast in the mold.
Figure 7:
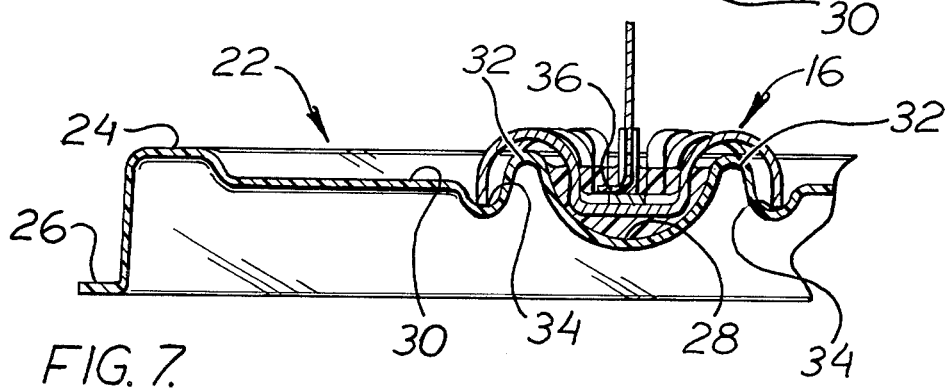
FIG. 7 is a still further enlarged, fragmentary, cross-sectional view of the FIG. 5 mold, taken along line 7—7 of FIG. 5 and showing, additionally, a pair of six-legged cogs positioned as illustrated in FIG. 6, a body of molded plastic in a center depression in the mold and a fragmentary portion of a wire flower "stem" with one end embedded in the plastic.

FIGS. 5–7 show a mold 22 suitable for use in the molding of a flower of different specific design from, but the same general type as, flower F. Mold 22 is shaped from a flat sheet of polyethylene plastic of a type commercially available for mold-forming purposes. This sheet plastic is formed from low-density polyethylene and can be obtained from various sources, such as, for example, Alchem Plastics, Inc., of La Mirada, Calif. The material is made in various thicknesses, and is typically sold in the form of square or rectangular pieces (of suitable size for individual purchaser needs) of specified thickness. We have found the preferred size piece for our mold forming purposes, as presently contemplated, to be 22½ × 24½ inches, and the preferred thickness to be 90-mil. We recommend the use of virgin material for the preparation of our molds, although this is not critically necessary to the successful practice of our invention. Suitably appropriate materials other than polyethylene can be employed in lieu of the latter for the preparation of these molds, if desired. RTV Silastic is the proprietary name of one such material, this being a rubber product of Dow-Corning Corp. manufactured primarily for use in the preparation of molds for three-dimensional objects.

As FIGS. 5 and 7 show, mold 22 has a raised part 24, with a flat upper surface, and a peripheral flange 26, adapted to support the mold on a flat surface of use, such as a table or bench top. The bottom surface of the flange 26 can, if desired, be roughened to provide a better grip on the flat surface. The flat upper surface of raised part 24 of the mold has a central well 28, serving as a mold for a flower pistil, and twelve petal-shaped depressions 30 serving as molds for twelve flower petals. Petal depressions 30 are evenly spaced around well 28, and each is separated therefrom by a dam 32 to prevent the flow of resin therebetween during the flower-molding operation.

Mold 22, as will be evident, can be used for the molding of either a six-petal or twelve-petal flower. When a six-petal flower is desired, a cog similar to cog 16 is placed on the mold so that the U-shaped segment of each of its legs extends over a dam 32 separating well 28 from a petal depression 30, and into a small depression 34 in the bottom of the latter, all as illustrated in FIG. 7. When the cog is so positioned, the ends of its six legs fit into every other one of the petal depressions 30, and the flower is molded by adding a polyester casting resin mix, or the equivalent, to those petal depressions in which the legs are disposed, and filling well 28 with the same, or other suitable, casting mixture. After the resin has set, the flower can be removed from the mold, and the U-shaped segments of the cog legs will serve as stems for the six petals formed in the petal depressions.

If a twelve-petal flower is desired, two cogs, rather than one, are employed. In this case, one of the cogs is first placed on the mold in the above-described manner. The second cog is then fitted down over the first one in such position that its legs extend into those petal depressions unoccupied by the legs of the latter. FIG. 5 shows the mold with two cogs positioned thereon in this manner. Each of the petal depressions (in addition to well 28) is now filled with a suitable casting mixture, to provide a twelve-petaled flower with a U-shaped stem between each petal and a central pistil.

It will be clear, particularly from FIG. 7, that the filling (by which is meant substantial, and not necessarily complete, filling) of well 28 and petal depressions 30 with suitable casting material results in embedment of the central portions of the two cogs in the pistil, and of the outer ends of the cog legs in the respective petals, of the finished flower. Where a flower stem is desired, a length of suitable wire, such as described above, can be bent at one end through an angle of about ninety degrees to form a foot 36 (see FIG. 7); the foot can then be held flat against a cog in well 28 (again see FIG. 7) until the casting material in the well hardens. Any suitable way of holding the wire in position until the casting material hardens can, of course, be employed within the scope of our invention. We have found, for example, that a simple way of so holding the wire is to merely prop its upper end against the edge of a conveniently located shelf.

The relatively small depression 34 in the bottom of each of the petal depressions 30 is a preferred, but not critical, feature of mold 22. The reason for depression 34 is twofold: it permits deeper cog leg embedment in the flower petals (to provide better anchoring of the legs in the petals) and adds a touch of decorative flair to the finished flower.

While the novel decorative item of our invention has been illustrated and described in what are considered to be preferred embodiments, it will be understood by those skilled in the art that departures may be made therefrom within the scope of the invention. Certain of these departures have been mentioned above and others will occur to those skilled in the art in the light of present teachings. Exemplary of the latter are noncritical variations of the shapes of the various parts of the illustrated flower. One such variation would result from the substitution of a cog with V-shaped or squared outer leg segments for the cog with U-shaped leg segments employed in the flower. Such a substitution would yield a flower with V-shaped or squared petal stems which, while not as effective as U-shaped stems for evening out petal-tilting stresses applied thereto, are nevertheless adequately effective for purposes of our invention to fall within its ambit of the latter.

Although this disclosure is pretty much limited to a discussion of artificial flowers, our invention is of broader significance than this might seem to imply. Thus, the invention encompasses objects, and the preparation of same, simulating butterflies and the like with wings, and other appendant parts, tiltable with respect to bodies, or the like, similarly to the way the petals of our artificial flowers are tiltable with respect to the pistils of the latter.

We claim:

1. A six-legged member formed from thin sheet metal and having a core segment and six legs of dead-soft character which extend equiangularly outwardly therefrom, said six-legged member being adapted for use in conjunction with a mold that is suitable for the preparation of a novel decorative item comprising, in combination, main body means, appendant means and elongate, dead-soft means interconnecting the appendant means and main body means to provide flexible stemlike means through which the appendant means can be tiltably adjusted relative to the main body means, said mold being characterized by the presence of spaced apart depressions in which hardenable material can be cast to form said main body means and said appendant means, said depressions being unconnected by flow paths permitting movement of a flowable material from one to another when said mold is disposed in its normal position of use;

said legs being so disposed and formed with U-shaped outer segments as to permit them to bridge the respective gaps between at least some of the depressions for said appendant means and the depression for said main body means in said mold when said six-legged member is positioned with its core segment in the latter depression and its legs extending toward said depressions for said appendant means;

whereby the casting of a suitable material in said depression for said main body means and in each of said depressions for said appendant means bridged to the former by a leg of said six-legged member when the latter is positioned with its core segment therein in the above-described manner, yields a novel decorative item in which said legs of said six-legged member form said stemlike means between said appendant means and said main body means.

2. Six-legged member in accordance with claim 1 formed from nickel-plated, low carbon sheet steel.

3. Six-legged member in accordance with claim 2 in which said sheet steel is of about 15-mil thickness.

* * * * *